US006965671B2

(12) United States Patent
Kao et al.

(10) Patent No.: US 6,965,671 B2
(45) Date of Patent: Nov. 15, 2005

(54) ELECTRIC PLUG FOR USE IN A MOBILE ELECTRONIC APPARATUS

(75) Inventors: Wan-Pei Kao, Taipei (TW); Su-Pei Yang, 2F, No. 110, Lane 103, Sec. 2, Nei Hu Rd., Taipei (TW)

(73) Assignees: Ing-Ming Lai, Taipei (TW); Su-Pei Yang, Taipei (TW)

( * ) Notice: Subject to any disclaimer, the term of this patent is extended or adjusted under 35 U.S.C. 154(b) by 351 days.

(21) Appl. No.: 10/461,435

(22) Filed: Jun. 16, 2003

(65) Prior Publication Data

US 2004/0253974 A1 Dec. 16, 2004

(51) Int. Cl.[7] ........................... H04M 1/00; H01R 4/24
(52) U.S. Cl. ....................................... 379/438; 439/397
(58) Field of Search ........................... 379/438, 433.05; 439/391, 397, 418, 440

(56) References Cited

U.S. PATENT DOCUMENTS 4,443,050 A * 4/1984 Taylor ........................ 439/397
6,080,007 A * 6/2000 Dupuis et al. .............. 439/418
6,305,967 B1 * 10/2001 Smith, III ................... 439/391

* cited by examiner

*Primary Examiner*—Jack Chiang
(74) *Attorney, Agent, or Firm*—Bacon & Thomas PLLC

(57) ABSTRACT

An electric plug for use in a mobile telephone to connect an electronic component to a circuit board is disclosed to include a plug body and two terminals fastened to a respective terminal slot in the plug body and connected to a respective electric wire in a respective wire hole in the plug body, each terminal slot having a broad bottom positioning section, a narrow top engagement section, a middle section connected between the bottom positioning section and the top engagement section, the middle section having a diameter smaller than the bottom positioning section but greater than the top engagement section, and a sloping guide section connected between the middle section and the top engagement section and sloping upwardly inwards from the middle section toward the top engagement section, the terminals each having a mounting base fitting the contour of the corresponding terminal slot and two hooked positioning portions forced into engagement with the peripheral wall of the bottom positioning section of the corresponding terminal slot.

3 Claims, 8 Drawing Sheets

ELECTRIC PLUG FOR USE IN A MOBILE ELECTRONIC APPARATUS

BACKGROUND OF THE INVENTION (a) Field of the Invention

The present invention relates to electric plugs for use in a mobile electronic apparatus, for example, a mobile telephone, to connect an electronic component, for example, a vibrator motor or buzzer, to a circuit board inside the mobile telephone.

(b) Description of the Prior Art

A mobile telephone generally uses a vibrator motor and a buzzer to give a signal to the user upon receipt of a call signal. The vibrator motor or buzzer is connected to a circuit board through an electric plug at the vibrator motor or buzzer and an electric socket at the circuit board. FIGS. 11~13 show an electric plug for this purpose. As illustrated, the electric plug 10 comprises a plug body 101 holding two electric wires 30 that extend from the vibrator motor (or buzzer), and two terminals 102 fastened to respective terminal slots 103 in the bottom side of the plug body 101 for connection to an electric plug 20 at a circuit board 40 in the mobile telephone. The terminals 102 are flat metal plate members, each having an upwardly extended crevice 104 and two sharp-edged clamping portions 105 at two sides of the crevice 104. When the terminals 102 inserted into the terminal slots 103 of the plug body 101, the sharp-edged clamping portions 105 of the terminals 102 are forced to cut into the insulators of the electric wires 30 and to make contact with the inside conductor of the electric wires 30 respectively. According to this design, the combined width of the two clamping portions 105 of each terminal 102 is smaller than the inner diameter of the terminal slots 103 so that the clamping portions 105 can be expanded when cutting into the insulator and touching the inside conductor of the corresponding electric wire 30 during its upward movement. Therefore, a gap A (see the arrow in FIG. 11) is left within the terminal slot 102 around the clamping portions 105 of the corresponding terminal 2 after installation of the terminal 2. Due to this drawback, the electric wires 30 tend to be pulled away from the clamping portions 105 of the terminals 2.

SUMMARY OF THE INVENTION

The present invention has been accomplished under the circumstances in view. It is the main object of the present invention to provide an electric plug for use in a mobile electronic apparatus, which eliminates the aforesaid drawbacks.

According to one aspect of the present invention, the electric plug comprises an electrically insulative plug body, the plug body having two terminal slots vertically extended through a bottom wall thereof and two wire holes respectively horizontally extended through front and back sidewalls thereof across the terminal slots, two electric wires respectively inserted into the wire holes, and two terminals respectively mounted in the terminal slots and electrically connected to the electric wires, the terminals each having a flat mounting base respectively mounted in the terminal slots and a narrow elongated plug portion downwardly extended from the flat mounting base to the outside of the plug body for connection to an electric socket at a circuit board, the flat mounting base having an upwardly extended crevice and two clamping portions arranged in parallel and separated by the crevice for piercing the insulator of the electric wires to contact respective conductors in the electric wires, wherein: the terminal slots has a broad bottom positioning section, a narrow top engagement section, a middle section connected between the bottom positioning section and the top engagement section, the middle section having a diameter smaller than the bottom positioning section but greater than the top engagement section, and a sloping guide section connected between the middle section and the top engagement section and sloping upwardly inwards from the middle section toward the top engagement section; the flat mounting base of each of the terminals has a counter fitting the bottom positioning section, middle section, sloping guide section and top engagement section of each of the terminal slots. According to another aspect of the present invention, the mounting base of each terminal comprises two hooked positioning portions symmetrically disposed at two sides for engaging the peripheral wall of the bottom positioning section of the corresponding terminal slot.

DETAILED DESCRIPTION OF THE PREFERRED EMBODIMENTS

Figure 1:
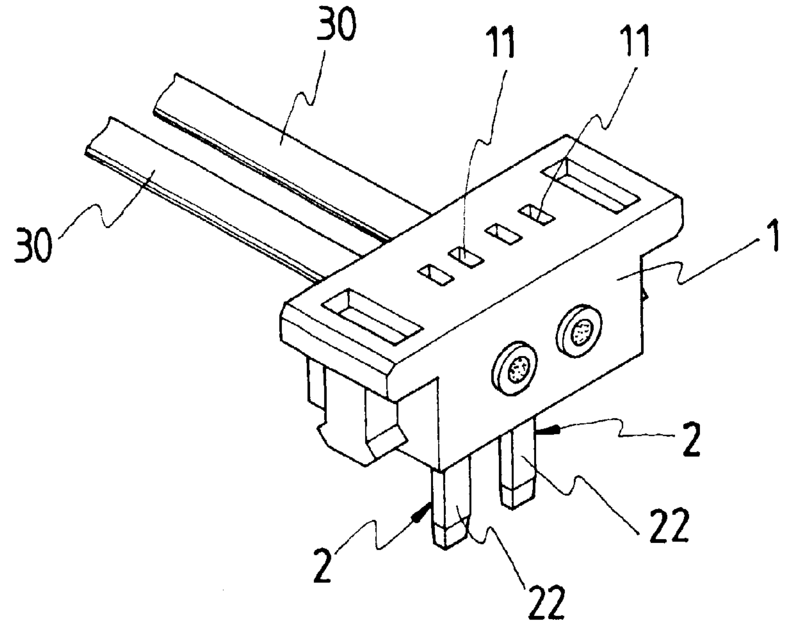
FIG. 1 is an elevational assembly view of an electric plug according to the present invention.
Figure 2:
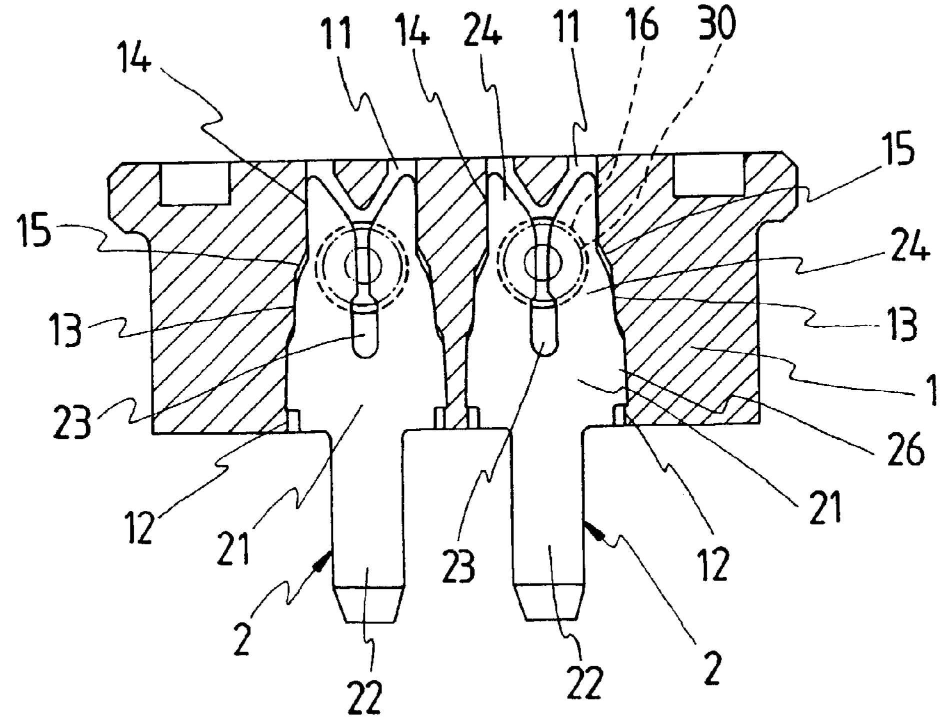
FIG. 2 is a front view in section of the electric plug according to the present invention.

Referring to FIGS. 1 and 2, an electric plug in accordance with the present invention is adapted for use in a mobile telephone to connect an electronic component, for example, a vibration motor, speaker or microphone to an electric socket at a circuit board in a mobile electronic apparatus, for example, a notebook computer, PDA, mobile telephone, or the like. As illustrated, the electric plug comprises a plug body 1 and two terminals 2.

Figure 3:
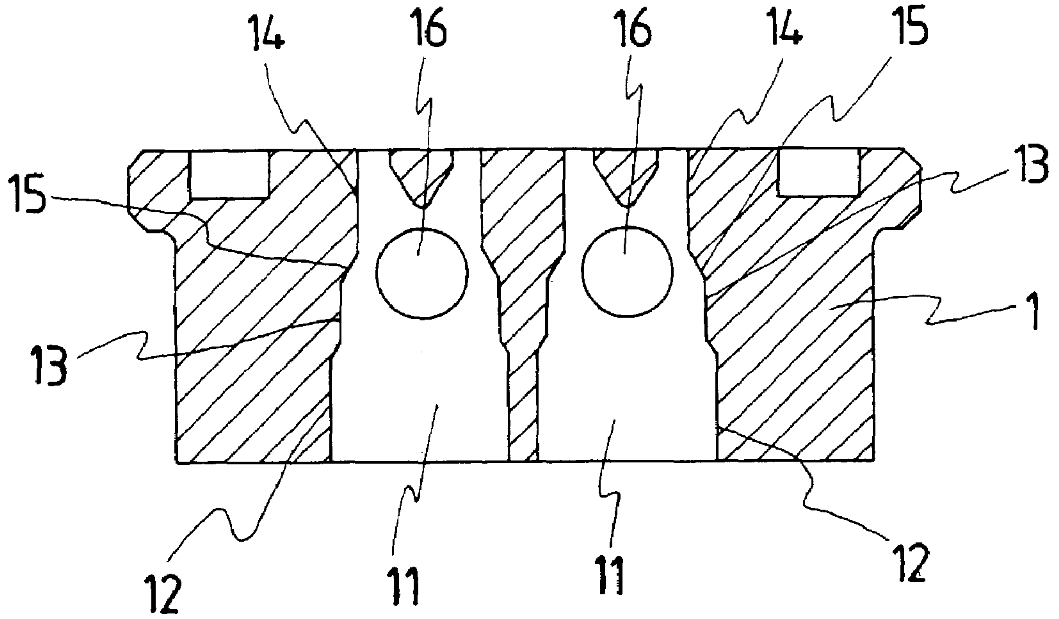
FIG. 3 is a front view in section of the plug body of the electric plug according to the present invention.
Figure 4:
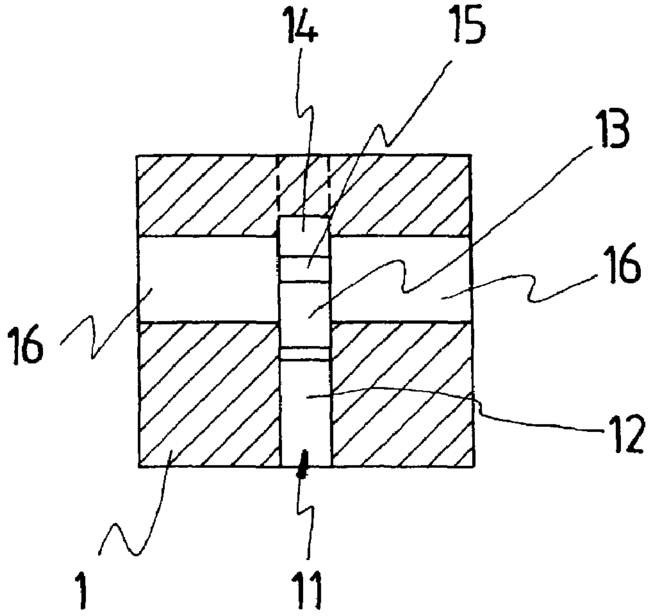
FIG. 4 is a side view in section of the plug body of the electric plug according to the present invention.

Referring to FIGS. 3 and 4 and FIGS. 1 and 2 again, the plug body 1 is an electrically insulative rectangular block member, having two flat bottom terminal slots 11 vertically extended through the bottom wall thereof and two wire holes 16 respectively horizontally extended through front and back sidewalls thereof across the terminal slots 11. Each terminal slot 11 has a broad bottom positioning section 12, a narrow top engagement section 14, a middle section 13 connected between the bottom positioning section 12 and the top engagement section 14, the middle section 13 having a diameter smaller than the bottom positioning section 12 but greater than the top engagement section 14, and a sloping guide section 15 connected between the middle section 13 and the top engagement section 14 and sloping upwardly inwards from the middle section 13 toward the top engagement section 14.

Figure 5:
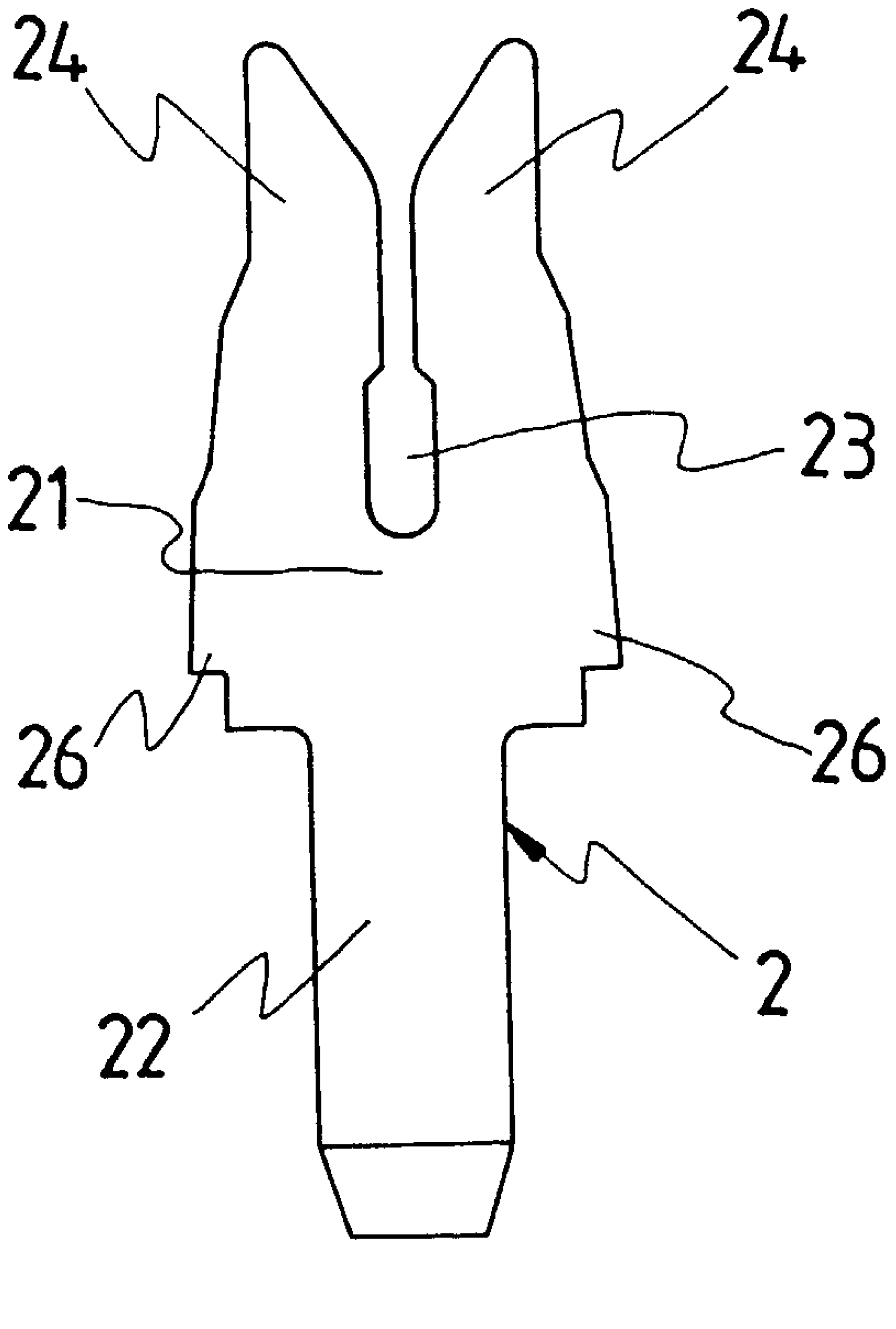
FIG. 5 is a plain view of a terminal for the electric plug according to the present invention.
Figure 7:
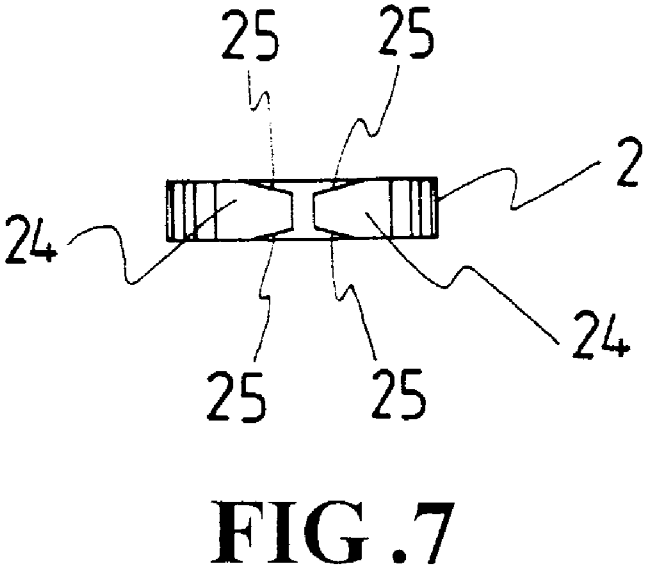
FIG. 7 is a top view of the electric plug shown in FIG. 6.
Figure 6:
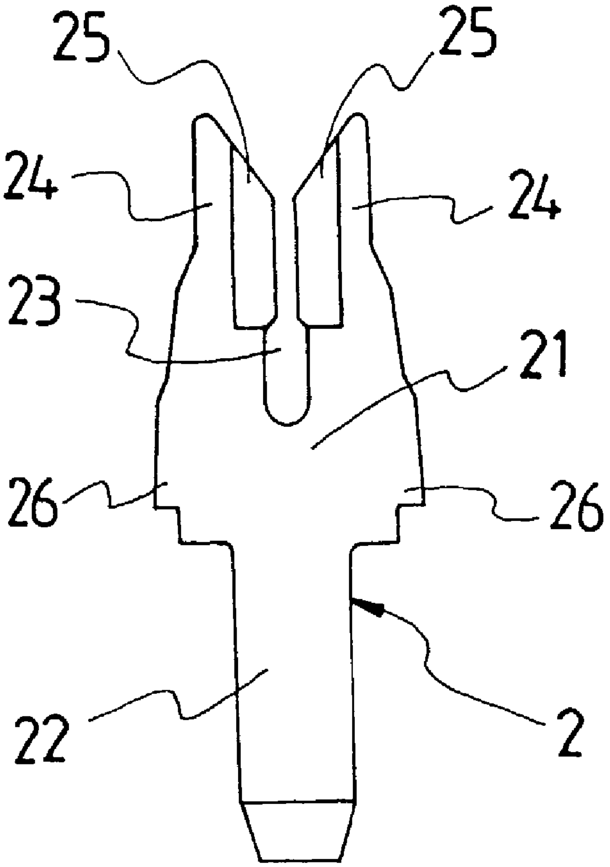
FIG. 6 is a front view of an alternate form of the electric plug according to the present invention.

Referring to FIGS. 5~7 and FIGS. 1 and 2 again, the terminals 2 each comprise a flat mounting base 21, and a narrow elongated plug portion 22 downwardly extended from the flat mounting base 21. The flat mounting base 21 has a counter fitting the bottom positioning section 12, middle section 13, sloping guide section 15 and top engagement section 14 of the terminal slot 11, having two hooked positioning portions 26 symmetrically disposed at two sides for engaging the peripheral wall of the bottom positioning section 12 of the corresponding terminal slot 11, an upwardly extended crevice 23, and two clamping portions 24 arranged in parallel and separated by the crevice 23. Each clamping portion 24 has two chamfers 25 symmetrically disposed at an inner side, forming a sharp cutting edge.

Figure 8:
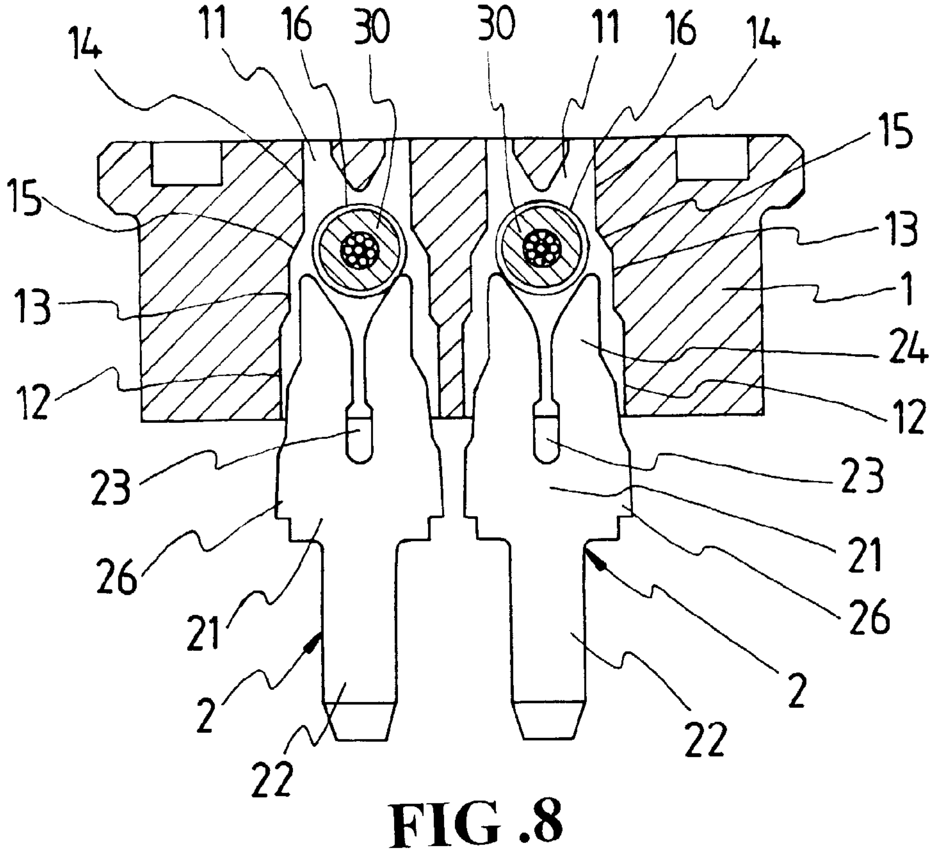
FIG. 8 is a sectional view of the present invention showing the installation of the terminals in the terminal slots of the plug body according to the present invention (I).
Figure 9:
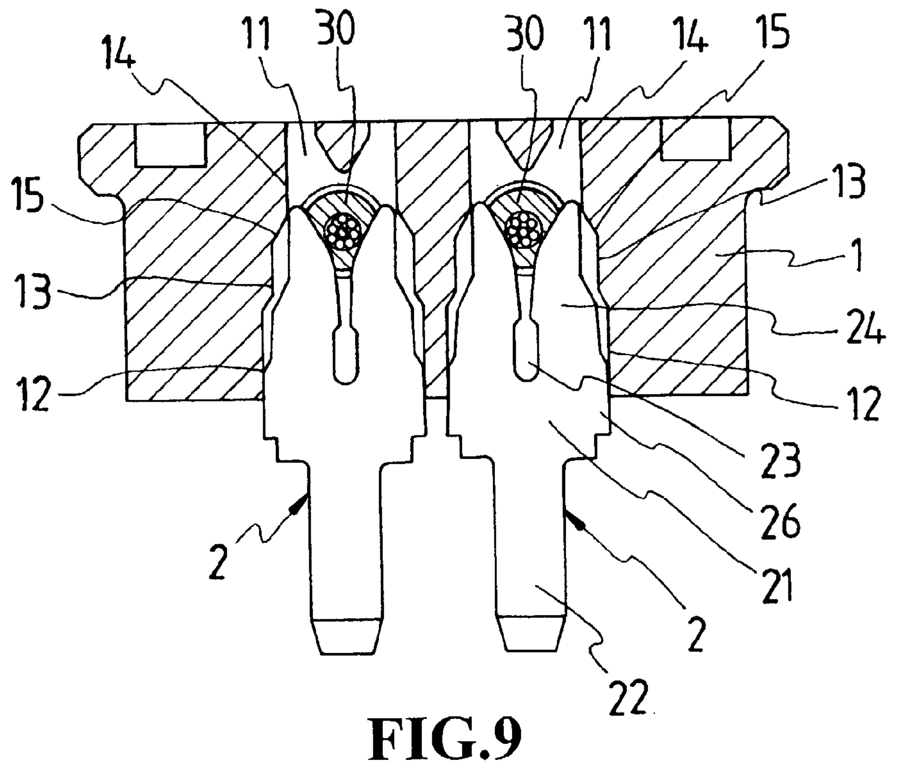
FIG. 9 is a sectional view of the present invention showing the installation of the terminals in the terminal slots of the plug body according to the present invention (II).

Referring to FIGS. 8 and 9 and FIG. 2 again, the terminals 2 are respectively inserted from the bottom side of the plug body 1 into the terminal slots 11 to couple the crevice 23 of each terminal 2 to the electric wires 30 in the wire holes 16 respectively and to engage the clamping portions 24 of each terminal 2 into the top engagement section 14 of each terminal slot 11. When set into position, the hooked positioning portions 26 of each terminal 2 are respectively hooked in the peripheral wall of the bottom positioning section 12 of each terminal slot 11.

Referring to FIGS. 2, 8 and 9 again, when the terminals 2 inserted into the terminal slots 11 and cut into the insulator of the electric wires 30 in the wire holes 16, the middle section 13 of each terminal slot 11 provides a space for enabling the two clamping portions 24 of the respective terminal 2 to be extended outwards in reversed directions. When the terminals 2 continuously moved upwards in the terminal slots 11, the clamping portions 24 of the terminals 2 are guided upwardly inwards by the sloping guide section 15 of each terminal slot 11 and then supported in the top engagement section 14 of each terminal slot 11 in positive contact with the inside conductors of the electric wires 30 respectively. Therefore, the terminals 2 are firmly positioned in the terminal slots 11 of the plug body 1 and maintained electrically positively connected to the electric wires 30.

Figure 10:
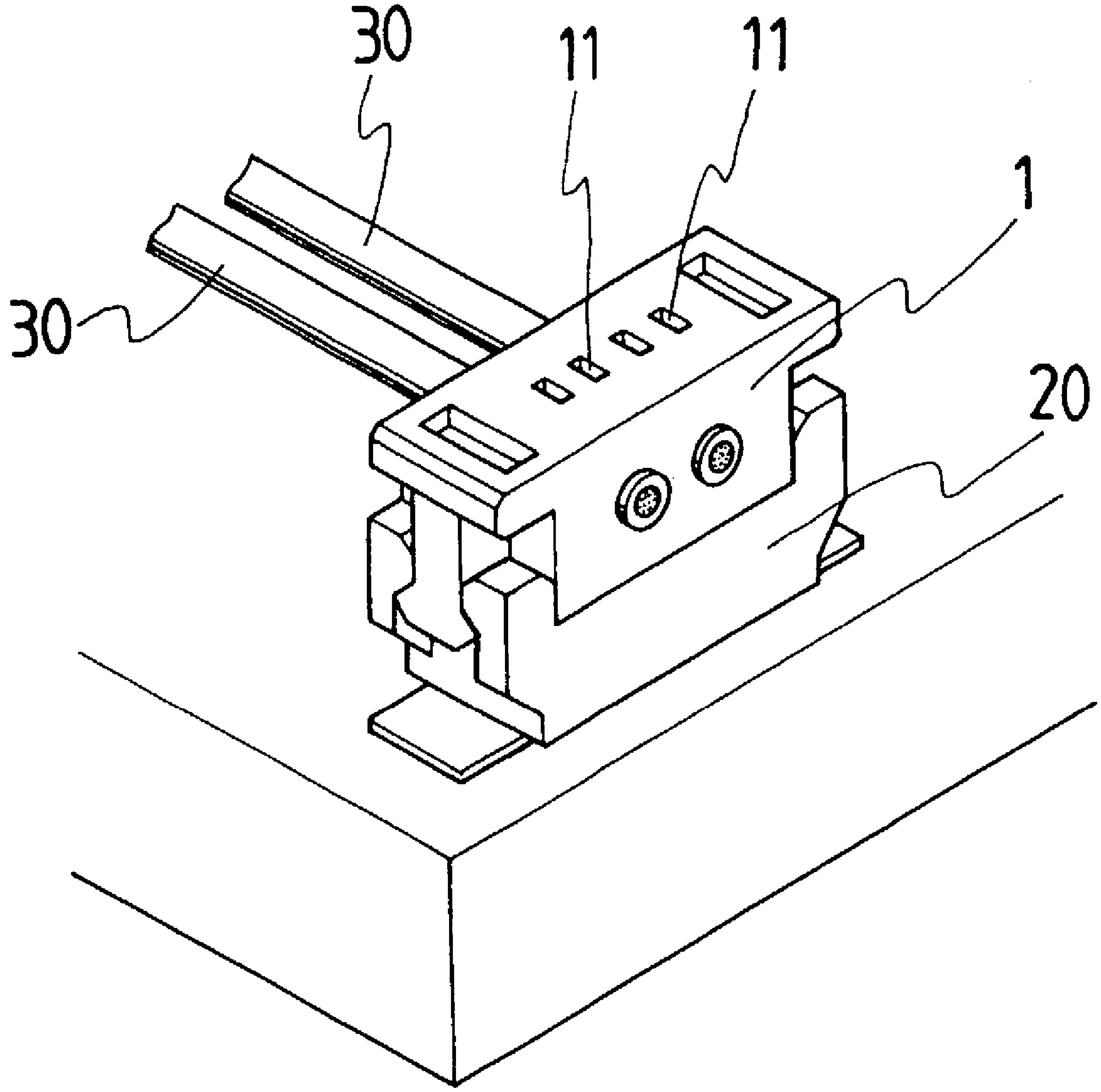
FIG. 10 is an elevational view showing the electric plug installed in an electric socket at a circuit board according to the present invention.
Figure 12:
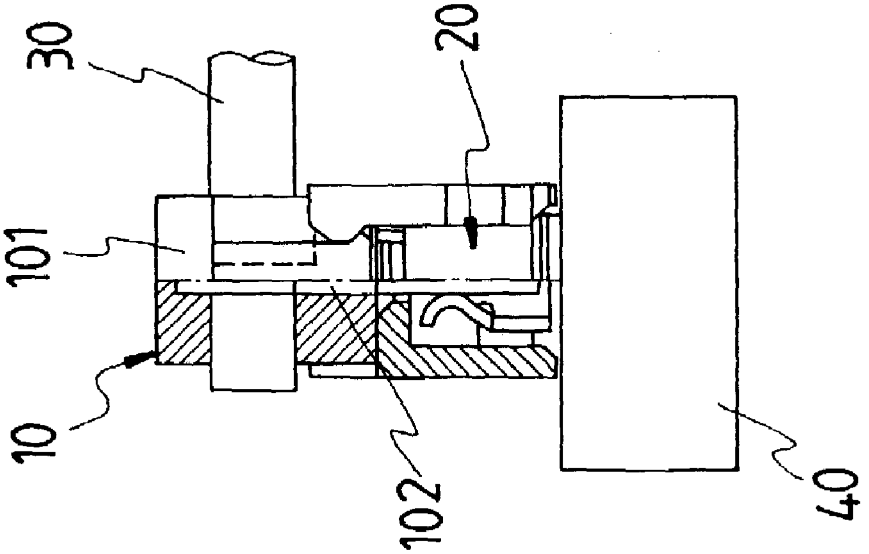
FIG. 12 is a side view in section of the prior art design.
Figure 11:
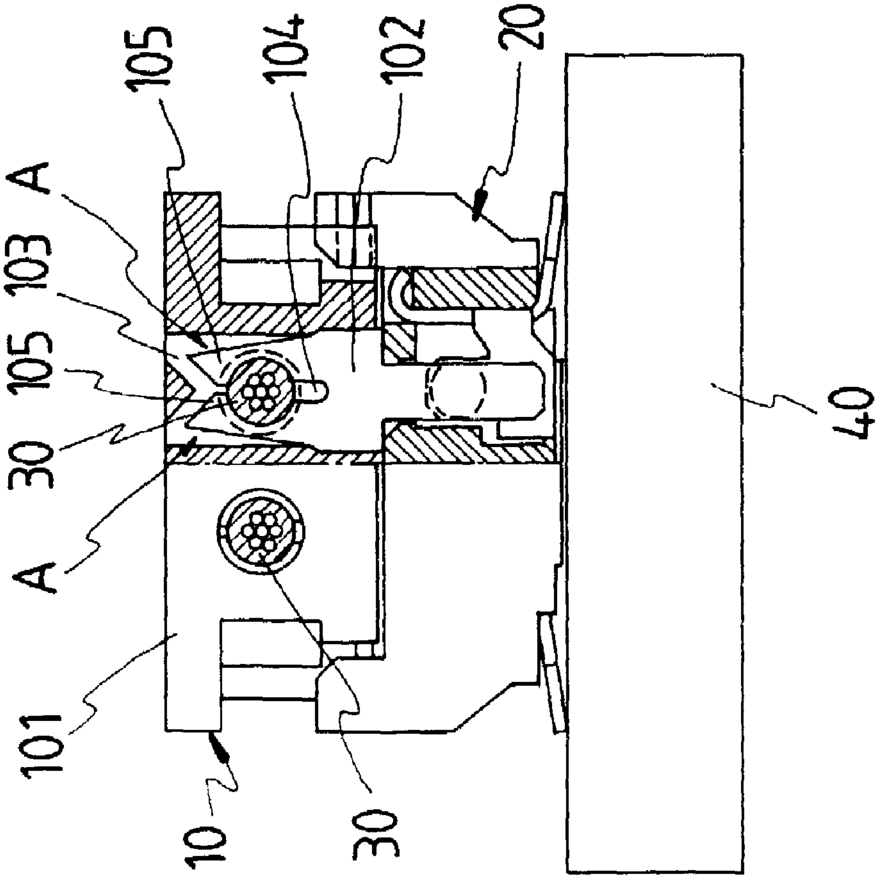
FIG. 11 is a front view in section of the prior art design.
Figure 13:
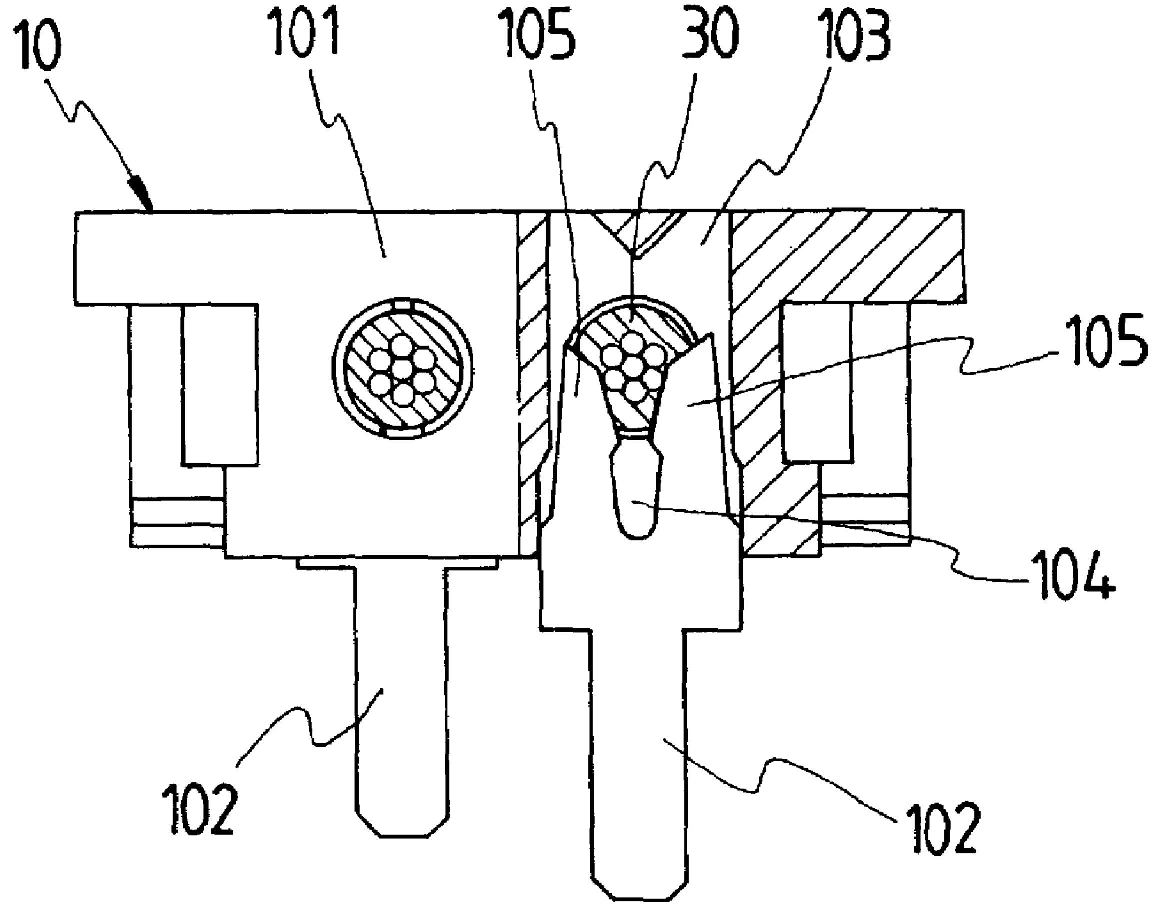
FIG. 13 is a schematic drawing showing the installation of the terminal in the corresponding terminal slot according to the prior art.

Referring to FIG. 10 and FIG. 9 again, by means of the narrow elongated plug portions 22 of the terminals 2, the electric plug is electrically connected to an electric socket 20 at a circuit board in the mobile telephone (not shown). Because the hooked positioning portions 26 of the terminals 2 are respectively hooked in the peripheral wall of the bottom positioning section 12 of each of the terminal slots 11, the plug body 1 does not fall from the terminals 2 and the electric socket 20 after insertion of the plug portions 22 of the terminals 2 into the electric socket 20.

A prototype of electric plug for use in a mobile electronic apparatus has been constructed with the features of FIGS. 1~10. The electric plug for use in a mobile electronic apparatus functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An electric plug comprising an electrically insulative plug body, said plug body having two terminal slots vertically extended through a bottom wall thereof and two wire holes respectively horizontally extended through front and back sidewalls thereof across said terminal slots, two electric wires respectively inserted into said wire holes, and two terminals respectively mounted in said terminal slots and electrically connected to said electric wires, said terminals each having a flat mounting base respectively mounted in said terminal slots and a narrow elongated plug portion downwardly extended from said flat mounting base to the outside of said plug body for connection to an electric socket at a circuit board, said flat mounting base having an upwardly extended crevice and two clamping portions arranged in parallel and separated by said crevice for piercing the insulator of said electric wires to contact respective conductors in said electric wires, wherein: said terminal slots has a broad bottom positioning section, a narrow top engagement section, a middle section connected between said bottom positioning section and said top engagement section, said middle section having a diameter smaller than said bottom positioning section but greater than said top engagement section, and a sloping guide section connected between said middle section and said top engagement section and sloping upwardly inwards from said middle section toward said top engagement section; the flat mounting base of each of said terminals has a counter fitting the bottom positioning section, middle section, sloping guide section and top engagement section of each of said terminal slots.

2. The electric plug as claimed in claim 1, wherein the mounting base of each of said terminals comprises two hooked positioning portions symmetrically disposed at two sides for engaging the peripheral wall of the bottom positioning section of the corresponding terminal slot.

3. The electric plug as claimed in claim 1, wherein the clamping portions of said terminals each has two chamfers symmetrically disposed at an inner side, forming a sharp cutting edge.

* * * * *